US010828696B2

(12) United States Patent
Van Hemelryck et al.

(10) Patent No.: US 10,828,696 B2
(45) Date of Patent: Nov. 10, 2020

(54) USE OF AMINE BLENDS FOR FOUNDRY SHAPED CORES AND CASTING METALS

(71) Applicant: ARKEMA FRANCE, Colombes (FR)

(72) Inventors: Bruno Van Hemelryck, Chaponost (FR); Pierre-Henri Vacelet, Saint Marcel (FR); Jean-Claude Roze, Gaillon (FR); Jens Muller, Haan (DE); Diether Koch, Mettman (DE)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/991,707

(22) Filed: May 29, 2018

(65) Prior Publication Data

US 2018/0272421 A1 Sep. 27, 2018

Related U.S. Application Data

(63) Continuation of application No. 14/853,156, filed on Sep. 14, 2015, now abandoned, which is a continuation of application No. 12/523,089, filed as application No. PCT/EP2008/050722 on Jan. 22, 2008, now abandoned.

(30) Foreign Application Priority Data

Jan. 22, 2007 (EP) .................................. 07100920

(51) Int. Cl.
| | | |
|---|---|---|
| *B22C 9/12* | (2006.01) | |
| *B01J 31/02* | (2006.01) | |
| *B22C 1/16* | (2006.01) | |
| *B22C 1/10* | (2006.01) | |
| *B22C 1/20* | (2006.01) | |
| *B22D 15/00* | (2006.01) | |
| *B22D 29/00* | (2006.01) | |

(52) U.S. Cl.
CPC ........... *B22C 9/123* (2013.01); *B01J 31/0237* (2013.01); *B22C 1/10* (2013.01); *B22C 1/162* (2013.01); *B22C 1/20* (2013.01); *B22D 15/00* (2013.01); *B22D 29/00* (2013.01)

(58) Field of Classification Search
None
See application file for complete search history.

(56) References Cited

U.S. PATENT DOCUMENTS

| | | | |
|---|---|---|---|
| 3,225,115 A | 12/1965 | McGary et al. | |
| 3,409,579 A | 11/1968 | Robins | |
| 3,429,848 A | 2/1969 | Robins | |
| 3,432,457 A | 3/1969 | Robins | |
| 3,485,797 A | 12/1969 | Robins | |
| 3,676,392 A | 7/1972 | Robins | |
| 4,268,425 A | 5/1981 | Gardikes | |
| 4,293,480 A | 10/1981 | Martin et al. | |
| 4,517,222 A | 5/1985 | Blegen | |
| 4,540,724 A | 9/1985 | Dunnavant et al. | |
| 4,546,124 A | 10/1985 | Laitar et al. | |
| 4,590,229 A | 5/1986 | Gardikes | |
| 4,634,758 A | 1/1987 | Laitar et al. | |
| 4,683,252 A | 7/1987 | Dunnavant et al. | |
| 4,780,360 A | 10/1988 | Kleeberg et al. | |
| 4,886,105 A | 12/1989 | Nisi et al. | |
| 5,135,043 A | 8/1992 | Drake | |
| 5,286,765 A | 2/1994 | Franke et al. | |
| 5,447,968 A | 9/1995 | Barnett et al. | |
| 5,981,622 A | 11/1999 | Geoffrey | |
| 6,136,888 A | 10/2000 | Torbus et al. | |
| 6,441,060 B1 | 8/2002 | Hendershot et al. | |
| 2004/0051078 A1 | 3/2004 | Gernon et al. | |
| 2005/0084123 A1 | 4/2005 | Lithe et al. | |
| 2005/0087321 A1 | 4/2005 | Hathaway | |
| 2005/0250874 A1 | 11/2005 | Tse | |
| 2006/0167167 A1 | 7/2006 | Ooba et al. | |

FOREIGN PATENT DOCUMENTS

| | | |
|---|---|---|
| CA | 2349878 A1 | 5/2000 |
| DE | 4327292 A1 | 2/1995 |
| EP | 132746 A1 | 2/1985 |
| EP | 0811027 B1 | 12/1997 |
| JP | 2005329408 A | 12/2005 |
| JP | 2006289467 A | 10/2006 |
| WO | 9505409 A1 | 2/1995 |
| WO | 9626231 A1 | 8/1996 |
| WO | 9806766 A2 | 2/1998 |
| WO | 9943455 A1 | 9/1999 |
| WO | 0025957 A1 | 5/2000 |
| WO | 2005092538 A1 | 10/2005 |
| WO | 2005092539 A1 | 10/2005 |
| WO | 2008089411 A1 | 7/2008 |

OTHER PUBLICATIONS

Final Office Action for U.S. Appl. No. 12/523,089, dated Aug. 30, 2013—11 pages.
Final Office Action for U.S. Appl. No. 12/523,089, dated Sep. 3, 2014—15 pages.
Non Final Office Action for U.S. Appl. No. 12/523,089, dated Aug. 17, 2012—5 pages.
Non Final Office Action for U.S. Appl. No. 12/523,089, dated Feb. 1, 2013—8 pages.
Non Final Office Action for U.S. Appl. No. 12/523,089, dated Mar. 7, 2014—10 pages.
Non Final Office Action for U.S. Appl. No. 12/523,089, dated Mar. 13, 2015—13 pages.
Entire patent prosecution history of U.S. Appl. No. 12/523,089, filed Feb. 9, 2010, entitled "Use of Amine Blends for Foundry Shaped Cores and Casting Metals."
Entire patent prosecution history of U.S. Appl. No. 14/853,156, filed Sep. 14, 2015, entitled "Use of Amine Blends for Foundry Shaped Cores and Casting Metals."

(Continued)

*Primary Examiner* — Melissa S Swain
(74) *Attorney, Agent, or Firm* — RatnerPrestia

(57) ABSTRACT

Provided is a catalyst suitable for curing a composite resin composition that includes comprising a blend of at least two tertiary amines selected from dimethylethylamine (DMEA), diethylmethylamine (DEMA), dimethylisopropylamine (DMIPA), and dimethyl-n-propylamine (DMPA), where each of the at least two tertiary amines is present in the blend in an amount of not less than 10% by weight and not more than 90% by weight.

22 Claims, No Drawings

(56) References Cited

OTHER PUBLICATIONS

VDG—Merkblatt Urethan-Cold-Box-Verfahren, Feb. 1998, 6 pages.
Giessereitechnik kompakt, Werkstoffe, Verfahren, Anwendungen, 2003, Giesserei-Verlag GmbH, Dusseldorf, 6 pages.
Giesserei Lexikon, Ausgabe 1988, Vierzehnte Auflage, Fachverlag Schiele & Schön GmbH, Berlin, 9 pages.
Eder, et al., "Geruchsminimierung bei der Kernfertigung mit PUR Cold Box Systemen (Odour minimization in core production using PUR cold box systems)", Gießerei-Rundschau, 2004, vol. 51, Issues 7/8, pp. 130-132.
Hemsen, et al., "Einsatz von Trimethy-lamin bei der Kernherstellung nach dem urethan-cold-box-Verfahren (Use of trimethylamine in cold production by the urethane cold box process)," Giesserei, vol. 78(11), pp. 372-374, May 27, 1991.
VDG—Merkblatt Urethane-Cold-Box-Verfahren, Feb. 1998, with English translation, 16 pages.
"Foundry Technology Compact," Giessereitechnik kornpakt, Werkstoffe, Verfahren, Anwendungen, 2003, Giesserei-Verlag GmbH, Dusseldorf, with English translation, 7 pages.
Giesserei Lexikon, Ausgabe 1988, Vierzehnte Auflage, Fachverlag Schiele & Schön GmbH, Berlin, with English translation, 17 pages.
Eder, et al., "Minimization of odour in core fabrication using PU coldbox systems" ("Geruchsminimierung bei der Kernfertigung mit PUR Cold Box Systemen"), Gießerei-Rundschau, 2004, 19 pages, vol. 51, Issues 7/8, with English translation.
Hemsen, et al., "Use of trimethylamine in coremaking by the urethane coldbox process" ("Einsatz von Trimethy-lamin bei der Kernhers-tellung nach dem urethan-cold-box-Verfahren"), Giesserei, vol. 78(11), 11 pages, May 27, 1991, with English translation.

USE OF AMINE BLENDS FOR FOUNDRY SHAPED CORES AND CASTING METALS

CROSS-REFERENCE TO RELATED APPLICATIONS

This application is a Continuation of U.S. patent application Ser. No. 14/853,156, filed 14 Sep. 2015, abandoned, which is a Continuation of U.S. patent application Ser. No. 12/523,089, filed on 9 Feb. 2010, abandoned, which is the national phase of International Application No. PCT/EP2008/050722, filed 22 Jan. 2008, which claims priority to European Application No. 07100920.3, filed 22 Jan. 2007. The disclosure of each of these applications is incorporated herein by reference in its entirety for all purposes.

This invention relates to the use of amine blends as curing agents for binder compositions useful in the foundry art for making cores that harden at room temperature. It also relates to combinations of foundry aggregates, such as sand and binder, generally based on phenolic (phenol aldehyde) resins and poly-isocyanates, which, on being formed into a coherent mass with the aggregate in a mould, generally a steel mould, is capable of being cured at room temperature by an amine blend used as curing agent. The self-supported cores as obtained can be used in making metal castings.

When the cured resins are based on both phenolic resins and polyisocyanates, the above process utilized in foundries is named Polyurethane Cold Box Process (PUCB).

BACKGROUND OF THE INVENTION

According to this method, a two-component polyurethane binder system is used for the bonding of sand. The first component consists in a solution of at least one polyol, generally comprising at least two OH groups per molecule. The second component is a solution of at least one isocyanate having at least two NCO groups per molecule.

The use of tertiary amines as curing agents has long been known in PUCB: see for example U.S. Pat. No. 3,429,848; U.S. Pat. No. 3,485,797; U.S. Pat. No. 3,676,392; and U.S. Pat. No. 3,432,457. Such tertiary amines are sometimes utilized with metal salts and provide a fast curing of phenol formaldehyde and poly-isocyanate resins at room temperature. They can be added to the binder system before the moulding stage, in order to bring the two components to reaction (U.S. Pat. No. 3,676,392) or they can pass in a gaseous form through a shaped mixture of an aggregate and the binder (U.S. Pat. No. 3,409,579).

Generally phenolic resins are used as polyols, which are prepared through condensation of phenol with aldehydes, preferably formaldehyde, in the liquid phase, at temperatures of up to around 130.degree. C., in the presence of divalent metal catalysts. The manufacture of such phenolic resins is described in detail in U.S. Pat. No. 3,485,797. In addition to unsubstituted phenol, substituted phenols, especially o-cresol and p-nonylphenol, can be used (see for example EP-A-0 183 782).

As additional reaction components, according to EP-B-0 177 871, aliphatic monoalcohols with one to eight carbon atoms can be used to prepare alkoxylated phenolic resins. According to this patent, the use of alkoxylated phenolic resins in the binder results in binders that have a higher thermal stability.

As solvents for the phenolic components, mixtures of high-boiling point polar solvents (for example, esters and ketones) and high boiling point aromatic hydrocarbons are typically used.

Preferred tertiary amines (catalyst) used in curing polyurethane cold box (PUCB) processes are trimethyl amine (TMA), dimethyl ethyl amine (DMEA), dimethyl iso-propylamine (DMIPA), dimethyl-n-propylamine (DMPA) and triethyl amine (TEA). All these tertiary amines are taught in the art to be used individually.

The catalyst is usually introduced as a combination of one inert gas and one amine, in the liquid or gaseous state. The boiling point of the amine is preferably below 100.degree. C. to permit evaporation and to achieve satisfactory concentration of amine in the amine-inert gas mixture injected into the steel mould. A boiling point below 100.degree. C. also helps to avoid condensation of the amine when it contacts the steel moulds.

However, the boiling point of the amine must be preferably high enough to facilitate handling of the amine. Trimethylamine (TMA) is a gas at normal ambient temperature (boiling point (Bp) 2.87.degree. C.), which makes it difficult to handle. Other drawbacks can be found with low boiling tertiary amines: the well-known low boiling tertiary amine DMEA (Bp 37.degree. C.) has undesirable organoleptic characteristics. In particular, it has a strong ammonia odor. Furthermore, this amine is very easily impregnated into skin and clothing, making a very unpleasant working environment when it is used.

On the other hand, the 89.degree. C. boiling point of triethylamine (TEA) is probably the highest practical boiling point because TEA tends to condensate out of the gas mixture in the piping which carries the amine-inert gas mixture to the steel mould in winter, and in addition badly cured spots are found in sand cores produced in the steel mould.

The molecular weight of the amine must be low enough to permit ready diffusion of the amine through sand in the steel mould, especially in the corners and edges of the mold. TEA, with molecular weight of 101, is probably the highest molecular weight amine permissible for the so-called Cold Process; it has a very low odor intensity and very low amine smell but displays lower curing ability than the tertiary amines with lower molecular weights (Mw) and boiling points.

On an industrial point of view, tertiary amines containing 5 carbon atoms such as DMIPA (Mw 87, Bp 67.degree. C.) or DMPA (Mw 87, Bp 65-68.degree. C.) or DEMA (Mw 87, Bp 65.degree. C.) constitute good compromise tertiary amines in the field of catalytic gassing agents for curing resins in cold box processes. Tertiary amines containing 5 carbon atoms require less energy input and lower gassing temperatures in PUCB equipment than TEA.

DMIPA has a better reactivity than TEA: 1 kg of DMIPA is capable of curing approximately 1200 kg of sand/resin mixture, whereas 1 kg of TEA is capable of curing only 900 kg of the same sand/resin mixture. DMIPA is less odorant than the lighter tertiary amine DMEA.

Despite all these known curing amine catalysts, there is still a need to provide an improved catalysis to the cold box process, i.e a catalyst which hardens binding resins more quickly than tertiary amines containing 5 or more carbons, and which does not possess the strong, irritating, and itching ammonia odor associated with tertiary amines containing 4 or 3 carbons such as dimethylethylamine (DMEA) or trimethylamine (TMA).

SUMMARY OF THE INVENTION

The present invention therefore relates to a new type of amine catalyst for cold box processes, said catalyst allowing a modulation of reactivity and safer and easier handling during use.

More precisely, the present invention first relates to the use of a blend of at least two tertiary amines as catalyst for curing a composite resin composition, especially for preparing a foundry shape by the said cold box process.

The use of the present invention has many advantages, among other a lower amount of the used curing blend of amines as compared to the amount theoretically expected, and allows a modulation of both properties of curing kinetics and safer handling and storage (less odorant and less flammable catalyst), as compared to the known catalysts used in the art, which only consist in one single amine.

DETAILED DESCRIPTION OF THE INVENTION

More particularly, the curing catalyst system used in the present invention is a blend of at least two tertiary amines, each displaying curing reactivity and/or odor difference from one another. The blends of amines used in the invention allow a modulation in reactivity.

Preferably the blend does not contain two $C_5$ tertiary amines. However, two $C_5$ tertiary amines mixed with one or more $C_3$, $C_4$ and/or $C_6$-$C_{10}$ amines are encompassed in the present invention.

Generally, the blend comprises from 10 to 90 parts by weight of any of the amines present in the catalytic mixture. Advantageously, each amine is present in the blend in an amount of not less than 10% by weight, and not more than 90% by weight.

Unless otherwise specified all percentages values in the present description and claims are understood to be % by weight.

The blend according to the use of the present invention is preferably a mixture of at least one tertiary amine having 3 to 5 carbon atoms with at least one tertiary amine having 6 to 10 carbons. Each tertiary amine generally is a trialkylamine, each alkyl group being linear, branched or cyclic, and two alkyl groups possibly forming, together with the nitrogen atom to which they are bonded, a cyclic group containing 2 to 9 carbon atoms, preferably 2 to 6 carbon atoms. The invention does not exclude tertiary amines that contain a second, third or even fourth tertiary nitrogen atom.

The tertiary amines used in the invention may be substituted with functional groups, which do not interfere in the catalytic action of the tertiary amines. As substitution functional groups of the tertiary amines, mention may be made for example of hydroxyl groups, alkoxy groups, amino and alkyl amino groups, ketoxy groups, thio groups, silyl groups and the like.

All tertiary amines used in the present invention are known, commercially available compounds, or may be easily prepared according to known processes, or directly or indirectly from processes disclosed in the scientific literature, patents, in the Chemical Abstracts or on the Internet.

According to a preferred embodiment, the blends comprise at least one amine having a low molecular weight with at least one amine of higher molecular weight.

According to another embodiment, preferred blends comprise at least one amine having a low boiling point with at least one amine of higher boiling point.

According to still another embodiment, preferred blends comprise at least one fast curing tertiary amine with at least one less reactive tertiary amine.

In another embodiment, preferred blends comprise at least a fast curing tertiary amine having a low molecular weight and a low boiling point with at least a less reactive tertiary amine of higher molecular weight and higher boiling point.

Through the use of such blends, curing of polyurethane binder is less odorant and safer to handle and store, than when a fast curing amine is applied alone, and faster and more complete than with the use of a high boiling tertiary amine alone.

Examples of $C_3$-$C_6$ amines that can be used in the present invention comprise:

$C_3$ amines: trimethylamine, N-methylaziridine;

$C_4$ amines: dimethylethylamine (DMEA), N-methylazetidine, N-ethylaziridine, $C_5$ amines: diethylmethylamine (DEMA), dimethylisopropylamine (DMIPA), dimethyl-n-propylamine (DMPA), N-n-propylaziridine, N-iso-propylaziridine, N-ethylazetidine, N-methylpyrrolidine, N,N,N',N'-tetramethyl diamino methane, $C_6$ amines: triethylamine (TEA), methylethyl-n-propylamine, methylethyl-iso-propylamine, dimethyl-n-butylamine, dimethyl-sec-butylamine, dimethyl-iso-butylamine, dimethyl-tert-butylamine, N-ethylpyrrolidine, N-methylpiperidine, hexamethylene tetramine, dimethyl piperazine, N,N,N',N'-tetramethyl diamino ethane, $C_7$ amines: dimethylpentylamines, methylethylbutylamines, diethylpropylamines, dipropylmethylamines, N-propylpyrrolidines, N-ethylpiperidine, $C_8$ amines: dimethylhexylamines, methylethylpentylamines, diethylbutylamines, dipropylethylamines, N-butylpyrrolidines, N-propylpiperidines, diethyl piperazine, $C_9$ amines: dimethylheptylamines, methylethylhexylamines, diethylpentylamines, tripropylamines, N-pentylpyrrolidines, N-butylpiperidines, $C_{10}$ amines: dimethyloctylamines, methylethylheptylamines, diethylhexylamines, ethylpropylpentylamines, dipropylbutylamines, N-pentylpiperidines.

Preferred amines for use in the blends according to the present invention are DMEA, DMIPA, DEMA, DMPA and TEA.

Examples of preferred blends of tertiary amines for use in the present invention are: DMEA-DMIPA, DMEA-DEMA, DMEA/DMPA and DMEA-TEA. Preferred blends are (weight ratios): 50/50 DMEA/DMIPA, 20/80 DMEA/DMIPA, 10/90 DMEA/DMIPA, 50/50 DMEA/DMPA, 20/80 DMEA/DMPA, 10/90 DMEA/DMPA, 50/50 DMEA/DEMA, 20/80 DMEA/DEMA, 10/90 DMEA/DEMA, 50/50 DMEA/TEA, 20/80 DMEA/TEA, 10/90 DMEA/TEA, 80/20 DMEA/TEA and 90/10 DMEA/TEA, preferably 20/80 DMEA/DMIPA, 20/80 DMEA/TEA and 80/20 DMEA/TEA. Preferably, the blend contains from 10 to 30 parts by weight of DMEA.

Such blends lead to improved curing efficiency as compared to the performance of the highest boiling amine in the catalytic mixture for polyurethane cold box curing and for odor improvement as compared to the odor carried by the lowest boiling component, if used alone.

Unexpectedly, blends of DMEA-DEMA and blends of DMEA-TEA, the composition of which preferably ranges from 10% to 50% by weight of DMEA to the total of the amine blend, display a synergy at curing; this curing synergy can be appreciated by measuring the global amount of amines blend needed for a 100% curing of a sand+binder mixture versus the theoretical amount of blend that is expected by adding the optimized volumes for each amine modulated by their abundance ratio in the blend.

Such a behavior is particularly advantageous because it allows not only a better and immediate volatile organic compounds (VOC) reduction as compared to other curing systems which do not display such a synergy, but also presents other advantages such as a faster curing than the one obtained with a high boiling and high molecular weight tertiary amine when used as single curing catalyst, and less pungent and clothe impregnating than the one obtained with a low boiling and low molecular weight tertiary amine when used as single curing catalyst.

Tertiary amine blends may be used in a liquid state or preferably in a gaseous state and in any desired predetermined concentration, alone or preferably in combination with an inert carrier.

The inert gaseous carrier can be nitrogen or air, but carbon dioxide, less expensive than nitrogen, is sometimes utilized.

It would not be outside the scope of the invention to use a mixture comprising, in addition to the tertiary amines blend, up to 25%, and preferably up to 10% by weight (to the total weight of all amines present in the blend) of at least one other, primary and/or secondary amine. However, the amount of primary and/or secondary amine in the amine blend is more preferably maintained at 0.5% by weight or less.

The tertiary amine blend can also comprise small amounts of water: the concentration of water in the blend is preferably kept below 0.2% by weight.

The present invention also relates to a process for preparing a foundry shape by the cold box process.

This process invention has many advantages, among other a lower amount of the used curing blend of amines as compared to the amount theoretically expected, and allows a modulation of both properties of curing kinetics and safer handling and storage (less odorant and less flammable catalyst), as compared to the known catalysts used in the art, which only consist in one single amine.

The invention thus relates to a process for preparing a foundry shape by the cold box process, which process comprises the following steps:

(a) forming a foundry mix with the binder and an aggregate, (b) forming a foundry shape by introducing the foundry mix obtained from step (a) into a pattern, (c) contacting the shaped foundry mix with a curing catalyst comprising a blend of at least two tertiary amines, in a liquid or preferably in a gaseous form, optionally with an inert carrier, (d) hardening the aggregate-resins mix into a hard, solid, cured shape, and (e) removing the hardened foundry shape of step (d) from the pattern.

The binder system comprises at least one phenolic resin component and at least one isocyanate component.

Phenolic resins are most generally manufactured by condensation of phenols and aldehydes (Ullmann's Encyclopedia of Industrial Chemistry, Bd. A19, pages 371 ff, 5th, edition, VCH Publishing House, Weinheim). Substituted phenols and mixtures thereof can also be used. All conventionally used substituted phenols are suitable.

The phenolic binders are preferably not substituted, either in both ortho-positions or in one ortho- and in the para-position, in order to enable the polymerization. The remaining ring sites may be substituted. There is no particular limitation on the choice of the substituent, as long as the substituent does not negatively influence the polymerization of the phenol and the aldehyde.

Examples of substituted phenols are alkyl-substituted phenols, aryl-substituted phenols, cycloalkyl-substituted phenols, alkenyl-substituted phenols, alkoxy-substituted phenols, aryloxy-substituted phenols and halogen-substituted phenols.

The above named substituents have 1 to 26, and preferably 1 to 12, carbon atoms. Examples of suitable phenols, in addition to the especially preferred unsubstituted phenols, are o-cresol, m-cresol, p-cresol, 3,5-xylol, 3,4-xylol, 3,4,5-trimethyl phenol, 3-ethylphenol, 3,5-diethylphenol, p-butyl-phenol, 3,5-dibutylphenol, p-amylphenol, cyclohexylphenol, p-octylphenol, 3,5-dicyclohexylphenol, p-crotylphenol, p-phenylphenol, 3,5-dimethoxyphenol, 3,4,5-trimethoxy-phenol, p-ethoxyphenol, p-butoxyphenol, 3-methyl-4-methoxyphenol, and p-phenoxyphenol. Especially preferred is phenol itself All aldehydes, which are traditionally used for the manufacture of phenolic resins, can be used within the scope of the invention. Examples of these are formaldehyde, acetaldehyde, propionaldehyde, furfuraldehyde, and benzaldehyde.

Preferably, the aldehydes commonly used should have the general formula R'CHO, where R' is hydrogen or a hydrocarbon radical with 1-8 carbon atoms. Particularly preferred is formaldehyde, either in its diluted aqueous form or as paraformaldehyde.

In order to prepare the phenolic resins, a molar ratio aldehyde to phenol of at least 1.0 should be used. A molar ratio of aldehyde to phenol is preferred of at least 1:1.0, with at least 1:0.58 being the most preferable.

In order to obtain alkoxy-modified phenolic resins, primary and secondary aliphatic alcohols are used, having an OH-group containing from 1 to 10 carbon atoms. Suitable primary or secondary alcohols include, for example, methanol, ethanol, n-propanol, isopropanol, n-butanol, and hexanol. Alcohols with 1 to 8 carbon atoms are preferred, in particular, methanol and butanol.

The manufacture of alkoxy-modified phenolic resins is described for example in EP-B-0 177 871. They can be manufactured using either a one-step or a two-step process. With the one-step-process, the phenolic components, the aldehyde and the alcohol are brought to a reaction in the presence of suitable catalysts. With the two-step-process, an unmodified resin is first manufactured, which is subsequently treated with alcohol.

The ratio of alcohol to phenol influences the properties of the resin as well as the speed of the reaction. Preferably, the molar ratio of alcohol to phenol amounts to less than 0.25. A molar ratio of from 0.18-0.25 is most preferred. If the molar ratio of alcohol to phenol amounts to more than 0.25, the moisture resistance decreases.

Suitable catalysts are divalent salts of Mn, Zn, Cd, Mg, Co, Ni, Fe, Pb, Ca and Ba. Zinc acetate is preferred.

Alkoxylation leads to resins with a low viscosity. The resins predominantly exhibit ortho-ortho benzyl ether bridges and furthermore, in ortho- and para-position to the phenolic OH-groups, they exhibit alkoxymethylene groups with the general formula —$(CH_2O)_nR$. In this case R is the alkyl group of the alcohol, and n is a small whole number in the range of 1 to 5.

All solvents, which are conventionally used in binder systems in the field of foundry technology, can be used. It is even possible to use aromatic hydrocarbons in large quantities as essential elements in the solution, except that those solvents are not preferred because of environmental considerations. For that reason, the use of oxygen-rich, polar, organic solvents are preferred as solvents for the phenolic resin components. The most suitable are dicarboxylic acid ester, glycol ether ester, glycol diester, glycol diether, cyclic ketone, cyclic ester (lactone) or cyclic carbonate.

Cyclic ketone and cyclic carbonate are preferred. Dicarboxylic acid ester exhibits the formula $R_1OOC$—

$R_2$-COO$R_1$, where the $R_1$, independently from one another, represent an alkyl group with 1-12, and preferably 1-6 carbon atoms, and $R_2$ is an alkylene group with 1-4 carbon atoms. Examples are dimethyl ester from carboxylic acids with 4 to 6 carbon atoms, which can, for example, be obtained under the name "dibasic ester" from DuPont.

Glycol ether esters are binders with the formula $R_3$-O-$R_4$-OOC$R_5$, where $R_3$ represents an alkyl group with 1-4 carbon atoms, $R_4$ is an alkylene group with 2-4 carbon atoms, and $R_5$ is an alkyl group with 1-3 carbon atoms (for example butyl glycolacetate), with glycol etheracetate being preferred. Glycol diesters exhibit the general formula $R_5$COO-$R_4$-OOC$R_5$ where $R_4$ and $R_5$ are as defined above and the remaining $R_5$ are selected, independently of each other (for example, propyleneglycol diacetate), with glycol diacetate being preferred.

Glycol diether is characterized by the formula $R_3$-O-$R_4$-O-$R_3$, where $R_3$ and $R_4$ are as defined above and the remaining $R_3$ are selected independent of each other (for example, dipropyleneglycol dimethyl ether). Cyclic ketone, cyclic ester and cyclic carbonate with 4-5 carbon atoms are likewise suitable (for example, propylene carbonate). The alkyl- and alkylene groups can be branched or unbranched.

These organic polar solvents can preferably be used either as stand-alone solvents for the phenolic resin or in combination with fatty acid esters, where the content of oxygen-rich solvents in a solvent mixture should predominate. The content of oxygen-rich solvents is preferably at least 50% by weight, more preferably at least 55% by weight of the total solvents.

Reducing the content of solvents in binder systems can have a positive effect on the development of smoke. Whereas conventional phenolic resins generally contain around 45% by weight and, sometimes, up to 55% by weight of solvents, in order to achieve an acceptable process viscosity (of up to 400 mPas), the amount of solvent in the phenolic-component can be restricted to at most 40% by weight, and preferably even 35% by weight, through the use of the low viscosity phenolic resins described herein, where the dynamic viscosity is determined by the Brookfield Head Spindle Process.

If conventional non alkoxy-modified phenolic resins are used, the viscosity with reduced quantities of solvent lies well outside the range, which is favorable for technical applications of up to around 400 mPas. In some parts, the solubility is also so bad that at room temperature phase separation can be observed. At the same time the immediate strength of the cores manufactured with this binder system is very low.

Suitable binder systems exhibit an immediate strength of at least 150 N/cm$^2$ when 0.8 parts by weight each of the phenolic resin and isocyanate component are used for 100 parts by weight of an aggregate, like, for example, Quarzsand H32 (see for instance EP 771 599 or DE 43 27 292).

The addition of fatty acid ester to the solvent of the phenolic component leads to especially good release properties. Fatty acids are suitable, such as, for example, those with 8 to 22 carbons, which are esterified with an aliphatic alcohol. Usually fatty acids with a natural origin are used, like, for example, those from tall oil, rapeseed oil, sunflower oil, germ oil, and coconut oil. Instead of the natural oils, which are found in most mixtures of various fatty acids, single fatty acids, like palmitic fatty acid or myristic fatty acid can, of course, be used.

Aliphatic mono alcohols with 1 to 12 carbons are particularly suitable for the esterification of fatty acids. Alcohols with 1 to 10 carbon atoms are preferred, with alcohols with 4 to 10 carton atoms being especially preferred. Based on the low polarity of fatty acid esters, whose alcohol components exhibit 4 to 10 carbon atoms, it is possible to reduce the quantity of fatty acid esters, and to reduce the buildup of smoke. A line of fatty acid esters is commercially obtainable.

Fatty acid esters, whose alcohol components contain from 4 to 10 carbon atoms, are especially advantageous, since they also give binder systems excellent release properties, when their content in the solvent component of the phenolic component amounts to less than 50% by weight based upon the total amount of solvents in the phenolic resin component. As examples of fatty acid esters with longer alcohol components, are the butyl esters of oleic acids and tall oil fatty acid, as well as the mixed octyl-decylesters of tall oil fatty acids.

By using the alkoxy-modified phenolic resins described herein, aromatic hydrocarbons can be avoided as solvents for the phenolic component. This is because of the excellent polarity of the binders. Oxygen-rich organic, polar solvents, can now be used as stand-alone solvents. Through the use of the alkoxy-modified phenolic resins, the quantity of solvents required can be restricted to less than 35% by weight of the phenolic component. This is made possible by the low viscosity of the resins. The use of aromatic hydrocarbons can, moreover, be avoided.

The use of the binder systems with at least 50% by weight of the above named oxygen-rich, polar, organic solvents as components in the solvents of the phenolic components leads, moreover, to a doubtlessly lower development of smoke, in comparison with conventional systems with a high proportion of fatty acid esters in the solvent.

The two components of the binder system include an aliphatic, cycloaliphatic or aromatic polyisocyanate, preferably with 2 to 5 isocyanate groups. Based on the desired properties, each can also include mixtures of organic isocyanates. Suitable polyisocyanates include aliphatic polyisocyanates, like, for example, hexamethylenediisocyanate, alicyclic polyisocyanates like, for example, 4,4'-dicyclohexylmethanediisocyanate, and dimethyl derivates thereof. Examples of suitable aromatic polyisocyanates are toluol-2,4-diisocyanate, toluol-2,6-diisocyanate, 1,5-napththalene-diisocyanate, triphenylmethanetriisocyanate, xylylenediisocyanate and its methyl derivatives, polymethylenepolyphenyl isocyanate and chlorophenylene-2,4-diisocyanate. Preferred polyisocyanates are aromatic polyisocyanates, in particular, polymethylenepolyphenyl polyisocyanates such as diphenylmethane diisocyanate.

In general 10-500% by weight of the polyisocyanates compared to the weight of the phenolic resins are used. 20-300% by weight of the polyisocyanates is preferred. Liquid polyisocyanates can be used in undiluted form, whereas solid or viscous polyisocyanates can be dissolved in organic solvents. The solvent can consist of up to 80% by weight of the isocyanate components.

As solvents for the polyisocyanate, either the above-named fatty acid esters or a mixture of fatty acid esters and up to 50% by weight of aromatic solvents can be used. Suitable aromatic solvents are naphthalene, alkyl-substituted naphthalenes, alkyl-substituted benzenes, and mixtures thereof.

Especially preferred are aromatic solvents, which consist of mixtures of the above named aromatic solvents and which have a boiling point range of between 140 and 230.degree. C. However, preferably no aromatic solvents are used.

Preferably, the amount of polyisocyanate used results in the number of the isocyanate group being from 80 to 120% with respect to the number of the free hydroxyl group of the resin.

In addition to the already mentioned components, the binder systems can include one or more conventional additives, like, for example, those chosen from among silanes (see for instance U.S. Pat. No. 4,540,724), drying oils (U.S. Pat. No. 4,268,425) or "Komplexbildner" (WO 95/03903).

The binder systems are offered, preferably, as two-component-systems, whereby the solution of the phenolic resin represents one component and the polyisocyanate, also in solution, if appropriate, is the other component. Both components are combined and subsequently mixed with sand or a similar aggregate, in order to produce the moulding compound. The moulding compound contains an effective binding quantity of up to 15% by weight of the binder system with respect to the weight of the aggregate.

It is also possible to subsequently mix the components with quantities of sand or aggregates and then to join these two mixtures. Processes for obtaining a uniform mixture of components and aggregates are known to the expert. In addition, if appropriate, the mixture can contain other conventional ingredients, like iron oxide, ground flax fiber, xylem, pitch and refractory meal (powder).

In order to manufacture foundry-moulded pieces from sand, the aggregate should exhibit a sufficiently large particle size. In this way, the founded piece has sufficient porosity, and fugitive gasses can escape during the casting process. In general at least 80% by weight and preferably 90% by weight of the aggregate should have an average particle size of less than or equal to 290.mu.m. The average particle size of the aggregate should be between 100.mu.m and 300.mu.m.

For standard-founded pieces, sand is preferred as the aggregate material to be used, where at least 70% by weight, and preferably more than 80% by weight of the sand is silicon dioxide. Zircon, olivine, aluminosilicate sands and chromite sands are likewise suitable as aggregate materials.

The aggregate material is the main component in founded pieces. In founded pieces from sand for standard applications, the proportion of binder in general amounts to up to 15% by weight, and often between 0.5% and 7% by weight, with respect to the weight of the aggregate. Especially preferred is 0.6% to 5% by weight of binder compared to the weight of the aggregate.

Although the aggregate is primarily added dry, up to 0.1% by weight of moisture can be tolerated, with respect to the weight of the aggregate. The founded piece is cured so that it retains its exterior shape after being removed from the mold.

In a preferred implementation, silane with the general formula therefore —(R'—O)$_3$-Si—R— is added to the moulding compound before the curing begins. Here, R' is a hydrocarbon radical, preferably an alkyl radical with 1-6 carbon atoms, and R is an alkyl radical, an alkoxy-substituted alkyl radical or an alkyl amine-substituted amine radical with alkyl groups having 1-6 carbon atoms. The addition of from 0.1% to 2% by weight with respect to the weight of the binder system and catalysts, reduces the moisture sensitivity of the system.

Examples of commercially obtainable silanes are Dow Corning Z6040 and Union Carbide A-187 (.gamma.-glycidoxypropyltrimethoxysilane), Union Carbide A-1100 (.gamma.-aminopropyl triethoxysilane), Union Carbide A-1120 (N-.beta.(aminoethyl)-.gamma.-amino-propyltrimethoxysilane) and Union Carbide A1160 (ureidosilane).

If applicable, other additives can be used, including wetting agents and sand mixture extending additives (English Benchlife-additives), such as those disclosed in U.S. Pat. No. 4,683,252 or U.S. Pat. No. 4,540,724. In addition, mould release agents like fatty acids, fatty alcohols and their derivatives can be used, but as a rule, they are not necessary.

The curing of the founded piece (i.e. binder+aggregate) is carried out under conditions well known in the art, using, as catalytic system, a blend of at least two tertiary amines as hereinbefore described.

The present invention also relates to a process of casting a metal, said process comprises:

a) preparing a foundry shape as described above in steps (a) to (e), b) pouring said metal while in the liquid state into a round said shape;

c) allowing said metal to cool and solidify; and d) then separating the molded article from the foundry shape.

The invention is now further illustrated by the following examples, which are not intented to bring any limitation to the present invention.

EXAMPLES

A test was firstly carried out for the measurement of the optimized, i.e. minimum amount of, amine quantity of a single tertiary amine (DMEA, DEMA or DMIPA) or a blend of tertiary amines (DMEA-DEMA, DMEA-TEA) for full curing in order to show the difference of reactivity.

The various resins used for this test are commercial resins from Ashland-Avebene (Usine du Goulet-20, rue Croix du Vallot, 27600 St Pierre-la-Garenne, France) sold under the trade name Avecure®; these resins are composed of a formo-phenolic resin and of an isocyanate resin, in accordance with the present description.

The catalytic behaviour of the tertiary amines in polyurethane curing is assessed for each any resin: full curing of a 1.870-1.880 kg cylinder (length 300 mm.times.diameter 70 mm) of sand LA32+binder requires about 0.2-0.4 mL of DMEA, while it requires up to almost 1 mL of DEMA and can require up to about 1.5 mL of TEA. While using blends of DMEA-DEMA or DMEA-TEA, the following results are obtained:

Example 1

Blends of DMEA/DEMA

A fixed amount of sand+resins mixture with a predetermined amount of resins per mass unit of sand (normally between 0.5 and 2% by weight of each resin based on the amount of sand mixed) is placed in a long cylindrical shaped mould, the amine is poured as liquid ahead of the sand-resins cylinder in a U tube and a heated stream of carrier gas (normally nitrogen) at a fixed and predetermined rate is passed through the amine loaded U tubing.

The carrier gas stream brings the volatilized amine to the cylinder filled with sand+binder during a fixed time. Test cores were prepared as follows:

Into a laboratory mixer, 0.8 part by weight of the phenolic resin solution and 0.8 part by weight of the polyisocyanate solution are added to 100 parts by weight of sand LA32 (Silfraco), in the order given, and mixed intensively for 3 minutes. 6 kg of fresh sand are used for each resin to be cured. This quantity allows 3 gassings of 1.870-1.880 kg of sand+binder for repeatability sake.

The 3 gassings are made at 5.5 bars (static) equivalent to 4.8 bars (dynamic). 2 purgings of 10 seconds each are applied between each gassing operation. Gassing itself lasts 10 seconds at 1.5 bars (dynamic). Carrier gas heater is adjusted to 75.degree. C.+-0.3.degree. C. except for TEA for which it was modified to 95.degree. C.

The optimum (lowest) volume for 100% curing for each amine or blend of amine is obtained by increasing the volume of injected amine(s) by steps of 0.05 mL from 0, until reaching the catalytic volume for which no more sand is left free (100% curing, the sand+binder test core is totally solidified).

Amine(s) optimized volumes have been converted to weights required for full curing through usage of their corresponding densities. The amines density was measured or checked from literature on a densimeter Metier Toledo DA-100M. The density of DMEA is 0.678, the one of DEMA is 0.706, density of TEA is 0.728.

The checking of density value of blends versus the predicted one based on linear combination of individual density of each amine of the composition have shown that no volume contraction intervenes that could have accounted for lower volumes than expected at application.

Table 1 indicates the amounts (in grams) of single tertiary amine (DMEA or DEMA) and the amount of different DMEA/DEMA blends required for a full curing core test as described above. Theoretical masses (Theo. Mass) of blends needed for 100% test core curing in Table 1 are calculated according to the following equation:

Theo Mass=(ratio of DMEA.times.mass of DMEA alone needed for full curing+ratio of DEMA.times.mass of DEMA alone needed for full curing).

TABLE-US-00001 TABLE 1 Type of Resin Avecure® Avecure® Avecure® Amine 333/633 331/631 363/663 Mass of DMEA required 0.3051 0.339 0.2034 for 100% curing Mass of DEMA required 0.5656 0.777 0.31815 for 100% curing Experimental Mass of 50/50 0.38115 0.4158 0.2079 DMEA/DEMA blend Theoretical Mass of 50/50 0.43535 0.55835 0.260775 DMEA/DEMA blend Experimental Mass of 20/80 0.3861 0.5967 0.2808 DMEA/DEMA blend Theoretical Mass of 20/80 0.5135 0.68996 0.2952 DMEA/DEMA blend Experimental Mass of 10/90 0.45825 0.6345 0.282 DMEA/DEMA blend Theoretical Mass of 10/90 0.53955 0.73383 0.306675 DMEA/DEMA blend From the results of Table 1, it can be easily seen that a blend of DMEA-DEMA containing 10, 20 or 50% of DMEA is more reactive than DEMA alone, as seen by lower quantities requested for full curing in the case of blends.

The results given in Table 1 also indicate that for 10/90, 20/80 and 50/50 blends of DMEA/DEMA, the required global amount of amines for full curing the test core is lower that the scheduled one based on single amines, i.e. (ratio of DMEA.times.mass (g) of DMEA alone needed for full curing+ratio of DEMA.times.mass (g) of DEMA alone needed for full curing).

Example 2

Blends of DMEA/TEA

Theoretical masses (Theo. Mass) of blends needed for 100% test core curing are calculated according to the following equation:

Theo Mass=(ratio of DMEA.times.mass of DMEA alone needed for full curing+ratio of TEA.times.mass of TEA alone needed for full curing).

Table 2 indicates the amount of single tertiary amine (DMEA or TEA) and the amount of different DMEA/TEA blends required for a full test core curing as described above.

TABLE-US-00002 TABLE 2 Amine Mass (g) Mass (g) of of TEA Experimental Theoretical DMEA required mass (g) of mass (g) of required for for 100% 20/80 DMEA/20/80 DMEA/Resin 100% curing curing TEA blend TEA blend Avecure® 0.3729 0.9464 0.612 0.8317 373/673 Avecure® 0.3051 1.456 0.936 1.22582 353/653 Avecure® 0.3051 1.456 0.792 1.22582 333/633 Avecure® 0.339 1.456 0.936 1.2326 331/631 Avecure® 0.2034 0.9464 0.36 0.7978 363/663

The results of Table 2 show that quantities of the 20/80 DMEA/TEA blend needed for a full curing of the test core are lower than the quantity of TEA alone needed for a 100% curing.

The results of Table 2 also show that quantities of the 20/80 DMEA/TEA blend needed for a full curing of the test core are lower than theoretical amounts of the 20/80 DMEA/TEA blend as calculated by adding proportionally the optimized quantities of individual amines when used alone.

The invention claimed is:

1. A catalyst suitable for curing a composite resin composition, comprising:
    (a) 10% to 50% by weight of dimethylethylamine (DMEA), and
    (b) 50% to 90% by weight, in total, of at least one amine selected from the group consisting of diethylmethylamine (DEMA), dimethylisopropylamine (DMIPA), and dimethyl-n-propylamine (DMPA),
    wherein the sum of (a) and (b) totals 100% by weight.

2. The catalyst of claim 1, which comprises diethylmethylamine (DEMA).

3. The catalyst of claim 1, which comprises dimethylisopropylamine (DMIPA).

4. The catalyst of claim 1, which comprises dimethyl-n-propylamine (DMPA).

5. The catalyst of claim 1, wherein (b) comprises at least two of diethylmethylamine (DEMA), dimethylisopropylamine (DMIPA), and dimethyl-n-propylamine (DMPA).

6. The catalyst of claim 1, wherein the blend of at least two amines is chosen from 50/50 DMEA/DMIPA, 20/80 DMEA/DMIPA, 10/90 DMEA/DMIPA, 50/50 DMEA/DMPA, 20/80 DMEA/DMPA, 10/90 DMEA/DMPA, 50/50 DMEA/DEMA, 20/80 DMEA/DEMA, or 10/90 DMEA/DEMA, by weight.

7. The catalyst of claim 1, wherein the catalyst consists of DMEA and DEMA.

8. A composition, comprising the catalyst of claim 1, a binder, and an aggregate.

9. A process of preparing the catalyst of claim 1, comprising combining the amines.

10. A process for preparing a foundry shape by a cold box process, comprising:
    (a) forming a foundry mix comprising a binder and an aggregate,
    (b) forming a foundry shape by introducing the foundry mix obtained from (a) into a pattern,
    (c) contacting the foundry shape with the catalyst of claim 1, in a liquid or a gaseous form, optionally with an inert carrier,
    (d) hardening the foundry shape into a hard, solid, cured shape, and
    (e) removing the hardened foundry shape of (d) from the pattern.

11. The process of claim 10, wherein the inert carrier is gaseous and chosen from nitrogen, air, carbon dioxide or mixtures thereof.

12. The process of claim 10, wherein the catalyst is chosen from 50/50 DMEA/DMIPA, 20/80 DMEA/DMIPA, 10/90 DMEA/DM1PA, 50/50 DMEA/DMPA, 20/80 DMEA/DMPA, 10/90 DMEA/DMPA, 50/50 DMEA/DEMA, 20/80 DMEA/DEMA, or 10/90 DMEA/DEMA, by weight.

13. The process of claim 10, further comprising the step of hardening the hardened foundry shape obtained from (e).

14. The process of claim 10, further comprising:
(f) pouring metal in the liquid state around said hardened foundry shape;
(g) allowing the metal to cool and solidify forming a mounded article; and
(h) separating the molded article and the hardened foundry shape.

15. In a process for preparing a hardened foundry shape by a cold box process, the improvement comprising contacting a foundry shape containing a foundry mix comprising a binder and an aggregate with the catalyst according to claim 1.

16. A catalyst suitable for curing a composite resin composition, comprising a blend of at least two tertiary amines selected from the group consisting of 50/50 dimethylethylamine (DMEA)/diethylmethylamine (DEMA), 20/80 DMEA/DEMA, and 10/90 DMEA/DEMA, by weight.

17. The catalyst of claim 16, wherein the blend of at least two tertiary amines is 50/50 DMEA/DEMA, by weight.

18. The catalyst of claim 16, wherein the blend of at least two tertiary amines is 20/80 DMEA/DEMA, by weight.

19. The catalyst of claim 16, wherein the blend of at least two tertiary amines is 10/90 DMEA/DEMA, by weight.

20. A composition, comprising the catalyst of claim 16, a binder, and an aggregate.

21. A process of preparing the catalyst of claim 16, comprising combining the DMEA and DEMA.

22. A process for preparing a foundry shape by a cold box process, comprising:
(a) forming a foundry mix comprising a binder and an aggregate,
(b) forming a foundry shape by introducing the foundry mix obtained from (a) into a pattern,
(c) contacting the foundry shape with the catalyst of claim 16, in a liquid or a gaseous form, optionally with an inert carrier,
(d) hardening the foundry shape into a hard, solid, cured shape, and
(e) removing the hardened foundry shape of (d) from the pattern.

* * * * *